United States Patent [19]

Harkness

[11] 4,253,786

[45] * Mar. 3, 1981

[54] ARTICLE LOADING AND HANDLING DEVICE

[76] Inventor: Travis O. Harkness, Rte. 1, Box 95-A, Kaufman, Tex. 75142

[*] Notice: The portion of the term of this patent subsequent to Jan. 8, 1997, has been disclaimed.

[21] Appl. No.: 11,117

[22] Filed: Feb. 12, 1979

Related U.S. Application Data

[63] Continuation-in-part of Ser. No. 826,345, Aug. 22, 1977, Pat. No. 4,182,590.

[51] Int. Cl.³ .............................................. B65G 67/02
[52] U.S. Cl. .................................. 414/24.5; 414/501; 198/489
[58] Field of Search .................... 414/911, 24.5, 501, 414/910, 546, 785, 551, 722, 554, 622, 24.6, 685; 198/489, 743, 744

[56] References Cited

U.S. PATENT DOCUMENTS

| | | | |
|---|---|---|---|
| 2,539,233 | 1/1951 | Dickson | 414/622 |
| 2,651,428 | 9/1953 | Dickson | 414/622 |
| 3,584,736 | 6/1971 | DeMallie et al. | 414/684 X |
| 3,820,673 | 6/1974 | McVaugh | 414/546 |
| 3,935,954 | 2/1976 | Woods et al. | 414/24.5 X |
| 3,941,265 | 3/1976 | Nunnally, Jr. | 414/482 |
| 3,942,666 | 3/1976 | Pfremmer | 414/501 |
| 4,050,598 | 9/1977 | Schurz | 414/501 |
| 4,062,457 | 12/1977 | McLean | 414/24.5 |
| 4,182,590 | 1/1980 | Harkness | 414/501 X |

*Primary Examiner*—Frank E. Werner
*Attorney, Agent, or Firm*—Larry B. Dwight

[57] ABSTRACT

Apparatus to load, transport, and unload cylindrical bales of material generally comprising a frame disposed on a trailer. The end pickup mechanism generally comprises a pair of forks secured to a shaft rotatably secured to the end of the trailer and a second set of arms extending downwardly to the ground at an angle and a set of tines pivotally secured to the end of said arms to allow limited pivotal action relative to the ground. The tines are tapered to permit horizontal pickup of a bale of material which upon rotation of the shaft transmits the bale to the vertical arms which are moved to a horizontal position onto a second set of arms on a second shaft. By rotation of the second shaft the bale is moved to a third set of arms and the bale is moved sequentially along the trailer in this manner. The bales are unloaded by reversing the direction of the shafts. This process permits picking up of the bale, moving it along the trailer, transporting the bale, and unloading it by reversing it along the trailer and placing the original bottom of the bale back on the ground so that no further waste will occur in the bale.

7 Claims, 5 Drawing Figures

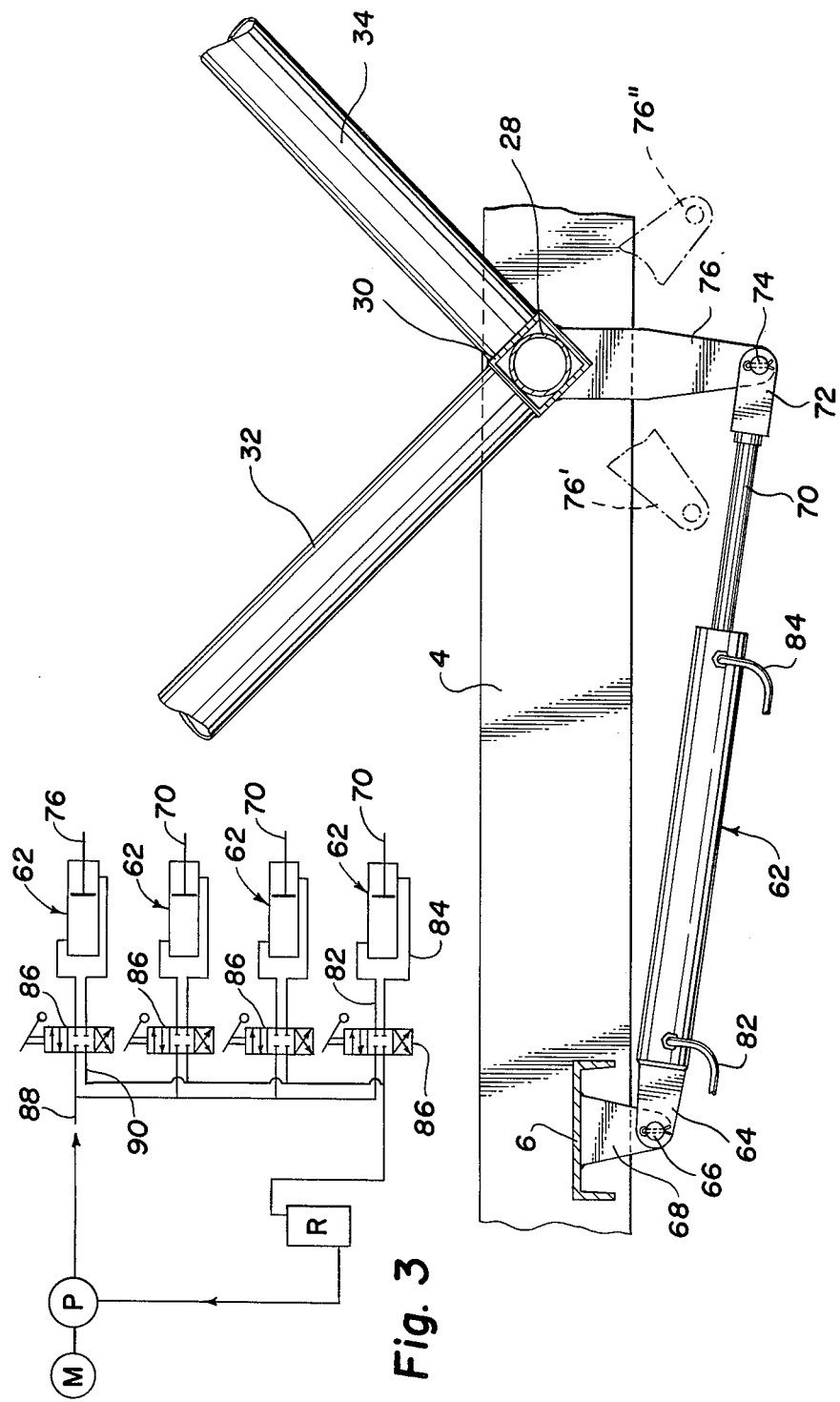

ARTICLE LOADING AND HANDLING DEVICE

CROSS-REFERENCED TO RELATED APPLICATIONS

This application is a continuation-in-part of my co-pending application Ser. No. 826,345 filed Aug. 22, 1977, now Pat. No. 4,182,590 entitled Article Loading and Handling Device.

BACKGROUND

Large cylindrical bales of material such as hay and the like are becoming increasingly popular due to the fact that they do not require baling wire which is an expensive commodity and hard to find and they may be stored in the field thereby reducing the cost of constructing storage facilities such as barns.

Several devices have been devised to handle the large round bales such as front loaders which are used to load the bales onto a flat bed trailer. However, the front loaders are dangerous in that they provide no protection to the operator. Further, they provide no easy method of unloading the bales other than dumping them and possibly causing the bale to unravel upon impact with the ground. Further, use of such devices often require more than one man which increases the cost of transporting the bales.

In loading and unloading bales within the pasture uneven ground is often encountered making it difficult to utilize a device which moves horizontally if the ground is sloping downwardly or upwardly.

U.S. Pat. Nos. 3,584,736; 3,941,265; 3,942,666; and 3,820,673 are devices which have been devised for handling large bales of material such as paper, film, hay and other material, etc.

SUMMARY

I have devised an apparatus to transport large cylindrical, sometimes called round, bales of material such as hay and the like from the pasture to a storage place. The device comprises a general trailer frame disposed on a tandem axle. A plurality of shafts are rotatably disposed between the side members of the frame. Each of the shafts has a pair of forks disposed in two planes perpendicular to each other such that when one pair of forks is lying substantially horizontal the other pair is extending vertically into the air. The end set of forks are adapted to pick up the round bale of hay. As the shaft is rotated such that the end set of forks are moved to a vertical position the bale is moved onto a second set of forks on the shaft which is moved to a horizontal position. By rotation of each shaft sequentially, the bale is moved to the far end of the trailer.

The pickup forks on the end shaft of the trailer generally comprise an angularly disposed pair of arms extending downwardly when the second set of arms is extended vertically into the air and a pair of tines pivotally secured to the end of the angularly extending arms to compensate for uneven ground on which the bale may be disposed. The pivotally secured arms allow limited motion upwardly and downwardly so that they may follow the ground upwardly and downwardly and slide under the bale without moving the bale.

As pickup arms are rotated they will rotate the bale onto the second set of arms on the first shaft and sequentially onto arms of other shafts.

A primary object of the invention is to provide apparatus which is capable of picking up large round bales of material such as hay on uneven ground which slopes downwardly or upwardly without damaging the bale of hay or without rolling same along the ground.

Another object of the invention is to provide apparatus which would move the round bales of hay sequentially along a trailer such that a single man may load and unload the bales of hay.

A still further object of the invention is to provide apparatus which would lift a bale of hay sitting on the ground upwardly and move same sequentially along the trailer in loading and return the same sequentially along the trailer for unloading and return the bottom of the bale which had previously been on the ground to the ground so that minimal damage will occur from decay of the hay in contact with the ground.

Other and further objects of the invention will become apparent upon reading the detailed description hereinafter following and studying the drawings annexed hereto.

DESCRIPTION OF THE DRAWINGS

Drawings of a preferred embodiment are annexed hereto so that the invention may be better and more fully understood, in which:

FIG. 2 is an enlarged cross-sectional view of the mechanism to rotate the shafts;

FIG. 3 is a diagrammatic view of the hydraulic control apparatus;

Numeral references are used to designate like parts throughout the various figures of the drawings.

DESCRIPTION OF A PREFERRED EMBODIMENT

Figure 1:
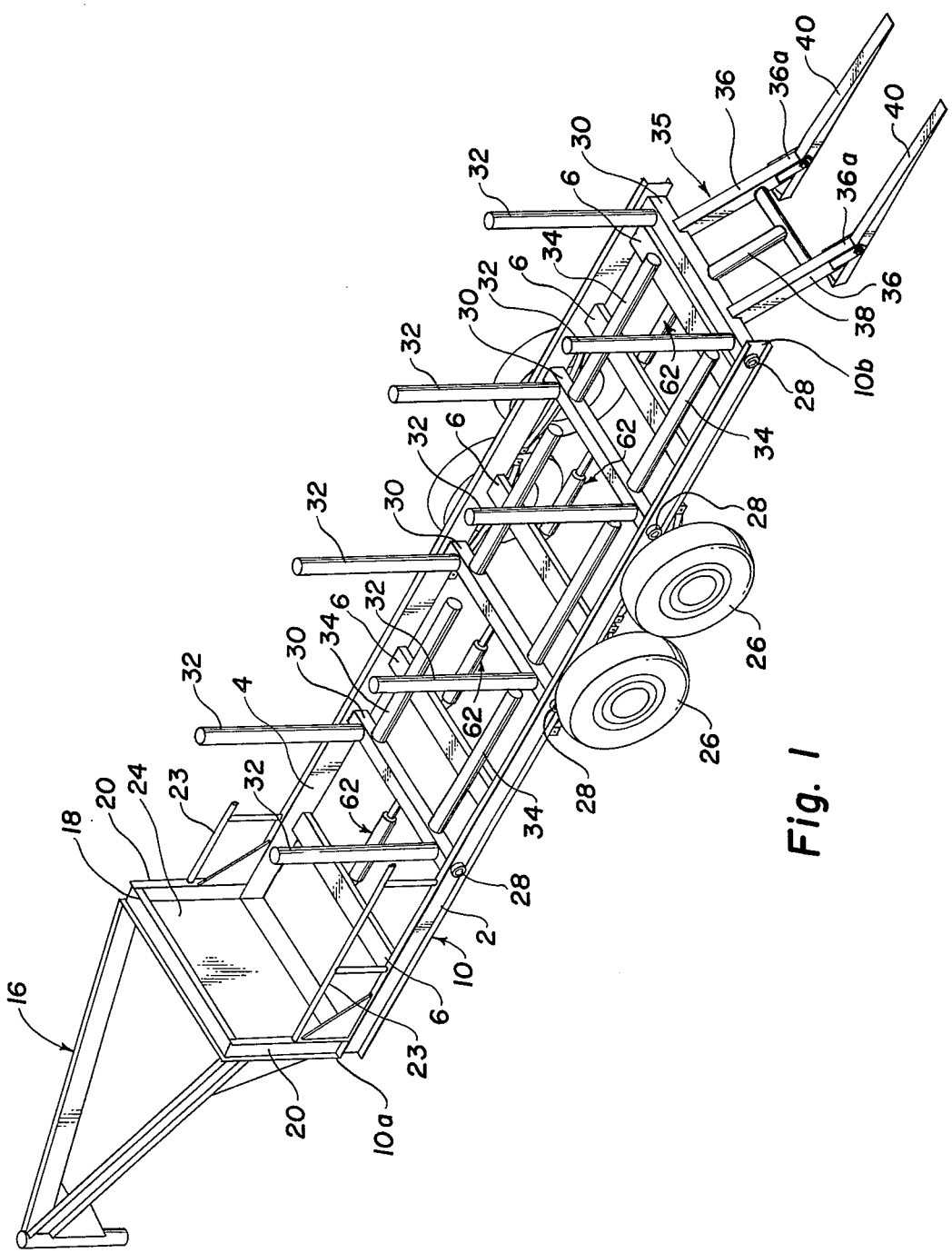
FIG. 1 is a perspective view of the transport apparatus.

Referring to FIG. 1, the device generally comprises a trailer 10 having side frame members 2 and 4 in spaced parallel relationship joined by transverse members 6. Transverse members 6 are spaced downwardly from the upper edge of side members 2 and 4 as will be more fully explained hereinafter.

Hitch means 8 to join the trailer 10 to a prime mover (not shown) may generally comprises a goose neck type hitch generally designated 16. The hitch 16 is joined to a rectangular frame 18 having side members 20 and an end panel 24. Each side of the side members 2 and 4 has rails 23 extending the length of the side members.

The trailer 10 is generally mounted on a set of wheels 26 which are joined by a typical axle and spring arrangement generally known in the art.

A plurality of shafts 28 are rotatably secured between side frame members 2 and 4 and suitable bearings or the like in spaced relationship along the length of the trailer 10. Square tubular members 30 are secured to the shafts to form a support for fork arms 32 and fork arms 34. Fork arms 32 are disposed toward the front 10a of the trailer 10 on sleeves 30 and, as viewed in FIG. 1, generally extend vertically in the air. The rearward positioned fork arms 34 are disposed on sleeve 30 toward the rear portion 10b of the trailer 10 and are generally horizontal as viewed in FIG. 1. The two sets of fork arms 32 and 34 are generally disposed in two planes which are substantially perpendicular to each other. Fork arms 34 are set inwardly of fork arms 32 to provide a staggered relationship such that rotation of fork arms 32 from a previous shaft to a horizontal position will not engage fork arms 32 on the adjacent shaft.

The pickup arms are generally designated 35 and extend downwardly toward the ground from the rearmost shaft 28. Arms 35 generally comprise a pair of angularly disposed arms 36 extending toward the ground when fork arms 32 on the end shaft are extending vertically. Fork arms 36 are reinforced by a T-shaped connector member 38. A pair of tines 40 are rotatably secured to the end 36a of arms 36.

Figure 4:
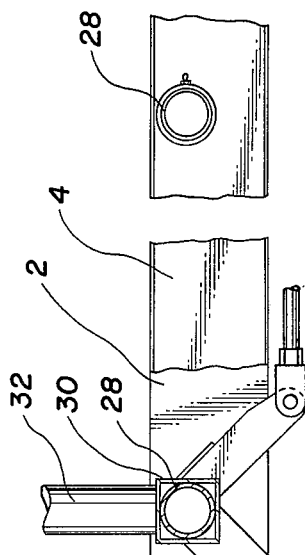
FIG. 4 is a side elevational view of the end of the trailer with parts broken away to more clearly illustrate the details of construction.
Figure 5:
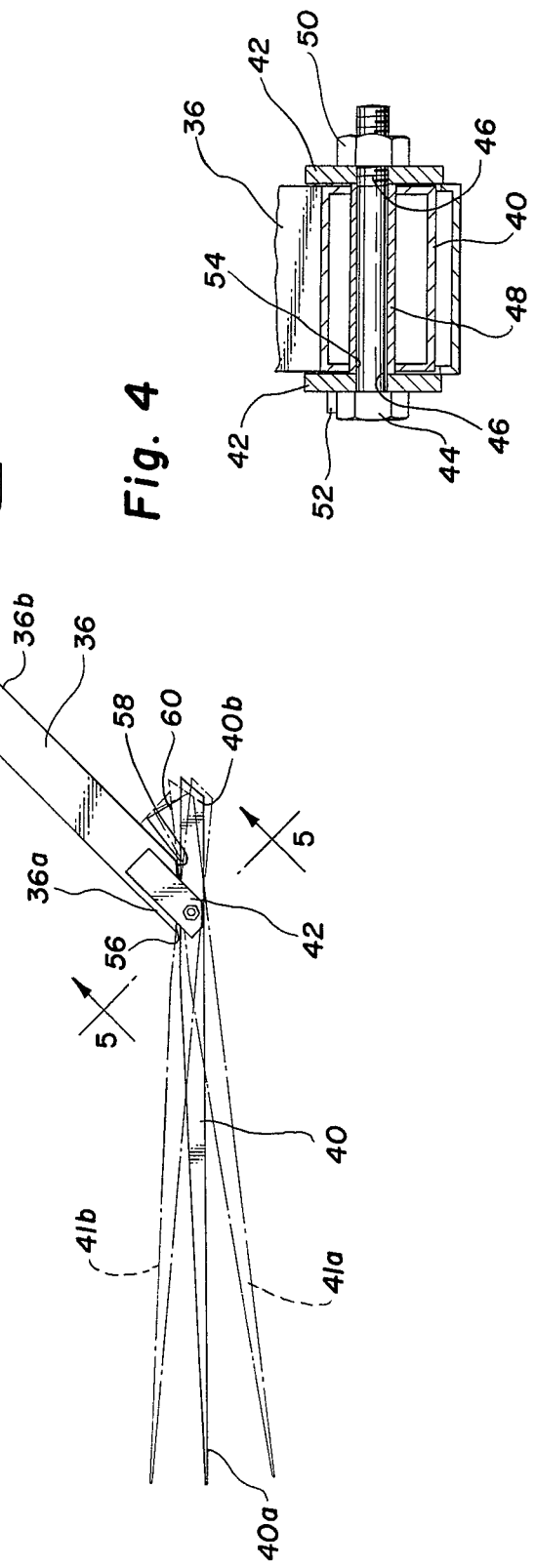
FIG. 5 is a cross-sectional view taken along line 5—5 of FIG. 4.

As best illustrated in FIGS. 4 and 5 the end 36a of arms 36 has a clevis 42 welded or otherwise secured on opposite sides of arms 36. A shaft formed by bolt 44 is journalled through apertures 46 and clevis 42 and through a sleeve bearing 48 and secured thereto by nut 50. Means to prevent rotation of bolt 44 generally comprises a lug 52 welded to one of the clevises 42. The tines 40 have apertures 54 formed on each side and are secured about sleeve bearing 48 and rotate between clevis 42. The end 36a of arms 36 are cut at an angle spaced from tines 40 so as to provide a first shoulder 56 to limit upward motion and a second shoulder 58 to limit downward motion of the tines.

The tines 40 basically comprise a long slender member being tapered on end 40a and being full thickness on end 40b. A safety block 60 is provided on end 40b to prevent undue strain and distortion of the end 40b when picking up a heavy bale of material. The upper surface of block 60 engages the rear surface 36b of arm 36. It should be readily apparent from the drawing that by adjusting the position of the first shoulder 56 and the second shoulder 58, any desired range of movement may be accomplished for allowing the movement of the tines 40 along downwardly sloping ground or horizontally sloping ground regardless of the position of side members 2 and 4 on the trailer. A preferred angle of between 30° and 60° to allow a 45° maximum differential between the lower most position, 41a shown in dashed outline, and the uppermost position 41b, shown in dashed outline is preferred.

Actuated means to rotate shafts 28 generally comprises a plurality of hydraulic cylinders 62 as best illustrated in FIG. 2. Hydraulic cylinders 62 have a first end having a lug 64 secured thereto and pivotally secured by pins 66 to downwardly depending lugs 68 secured in the central portion of transverse members 6. The outer end of the piston rod 70 has a clevis 72 which is pivotally secured by pin 74 to a downwardly depending lug 76. The hydraulic cylinders, as will be more fully explained hereinafter, are adapted to retract rods 70 to move the lug 76 to position shown in dashed outline 76' to lower arms 34 and raise arms 32. As rod 70 is extended to its outermost position to move lug 76 to the position 76" it will lower arms 32 and raise arms 34.

Each cylinder 62 has lines 82 and 84 secured thereto and connected to control means such as that diagrammatically illustrated in FIG. 3. Each of the lines 82 and 84 are secured to a lever actuated three position, two-way valve 86. A first inlet line 88 is connected to the pressure side of pump P driven by a motor M. Second line 90 is secured to the vent outlet line of valve 86 and is connected to a reservoir R of hydraulic fluid which communicates with the inlet side of pump P. The pump P is generally a hydraulic pump driven by a gasoline engine such as a five horsepower gasoline engine of typical construction mounted on the trailer. Since the trailer is meant to be self contained it has its own power source for driving the cylinders 62.

It should be readily apparent from FIG. 3 of the drawings that valve 86 is actuated by hand to connect the pressure side of the line 88 to line 82 to extend piston rod 70 on a single cylinder 62. Movement of the lever in the opposite direction will connect the pressure line 88 to line 84 and retract rod 70 to move the arms in the opposite direction. Each of the valves 86 are individually controlled to allow selective rotation of shafts 28 and movement of arms 32 and 34 to a desired position. As arms are moved they cradle the bale between the arms and move it to the adjacent area.

Operation of the hereinbefore described device is as follows:

A trailer 10 may be manuevered up to a round bale in the field by a tractor or a pick-up truck. With the rear pick-up arms 35 in a lowered position the tines 40 are slipped under the round bale by moving the trailer 10 rearwardly. The tines 40 will compensate for downwardly or upwardly sloping soil thus moving under the bale instead of being punched into the ground on upwardly sloping ground or engaging the bale on downwardly sloping ground. After movement of the tines 40 under the central portion of the bale, the valve controlling cylinder 62 on the pickup tines 35 is actuated to extend rod 70 to rotate shaft 28 lifting pickup tines 35 and moving fork arms 32 downwardly. The bale will move onto fork arms 32 and be lowered to the adjacent fork arms 34 of the adjacent shaft 28. Cross member 6 provides support for arms 34 and 32 as they lie in a common horizontal plane. It is preferred that cross member 6 be positioned such that the upper surface of the member 6 is spaced downwardly from the upper surface of side members 2 and 4 a distance equal to the diameter of the fork arms secured on the shafts 28 such that when fork arms 32 and 34 are moved into common horizontal plane they will be substantially parallel to one another.

By actuating the next valve controlling the second shaft 28 to extend piston rod 70, arms 34 are lifted while arms 32 are lowered thus moving the bale to the adjacent compartment formed by the fork arms. The bale is lowered by arms 32 onto the adjacent arms 34 of the third shaft 28. The bale is moved sequentially in a like manner to the rearmost compartment unfilled. The second bale is loaded in a like manner sequentially moving the bale from compartment to compartment.

To unload the bales, the process is reversed moving the bales forwardly. It should be readily apparent that the bales do not roll along arms 32 and 34 and thus the bottom of the bale which was initially on the ground is returned to the ground as the tines 40 of pickup arms 35 lower the bale to the ground. Upon moving the trailer forward tines 40 are moved out from under the bale.

It should be readily apparent from the foregoing that the hereinbefore described invention accomplishes each of the objects hereinbefore discussed.

It should further be readily apparent that other and further embodiments of the invention may be devised without departing from the spirit and scope of the appended claims.

Having described my invention, I claim:

1. A bale handling apparatus comprising: a frame having spaced parallel side members joined by plurality of spaced transverse connector members; wheel means operably secured to said frame to permit movement of said frame; a rearmost set of arms; means rotatably securing said rearmost set of arms between one end of the side members of said frame; a pair of tines; means pivotally securing said tines in spaced relationship on the end of the arms such that when said arms are rotated downwardly said tines are substantially parallel to the surface of the ground; means to limit movement of said tines upwardly and downwardly; a second pair of arms; means rotatably securing said second pair of arms between the side members adjacent said tines such that said second pair of arms extend vertically when said tines are parallel to the ground; means to rotate said rearmost arms and second pair of arms to lift a bale from the ground onto said second pair of arms to the frame; a third and fourth set of arms; means rotatably securing said third and fourth pair of arms between the side members of the frame and positioned substantially perpendicular to each other such that the intersection forms a center of rotation which is spaced from the second pair of arms; and means to rotate said arms to move said bale along said frame.

2. Apparatus according to claim 1 wherein said means to rotate said arms comprises: a cylinder having a rod operably secured between the frame and each set of arms; control means to selectively actuate said cylinder to extend and retract said rod; and a power supply means secured to said frame to supply said control means.

3. Apparatus according to claim 2 wherein said control means comprises: valve means operably connected to said cylinder; pump means operably connected to said valve means to extend and retract said rod on said cylinder.

4. Apparatus to transport and to lift from the ground cylindrical bales of material comprising: a frame having spaced parallel side members; transverse connector members secured between said side members; wheels operably secured to said frame to permit movement of said frame; a first shaft rotatably disposed between a rearmost portion of said side members of said frame; a second shaft rotatably disposed between said side members in spaced relation to said first shaft; a pair of tines; support members secured to said first shaft; a pair of arms secured to said first shaft; means pivotally securing one of said tines to each of said support members such that when said first shaft is rotated to a first position said tines are moveable to a position substantially parallel to the surface of the ground and said arms are substantially vertical and such that when said first shaft is rotated, to a second position said arms are horizontal and said tines are substantially vertical; second and third pairs of arms secured on said second shaft such that when said third pair of arms is substantially vertical the second pair of arms is substantially horizontal and vice versa; means to rotate said first and second shafts independently of each other; and means operably connected to each of said support members to limit movement of said tines upwardly and downwardly within a predetermined range.

5. Apparatus according to claim 4 wherein said means operably connected to said support member comprises: a first shoulder formed on the end of said support member adapted to engage said tines in the uppermost position; and a second shoulder formed on the end of said support member adapted to engage said tines in the lowermost position.

6. Apparatus according to claim 4 wherein said tines comprise: elongated, tapered members.

7. Apparatus according to claim 4 wherein said means to rotate said shafts comprises: a cylinder operably secured between said frame and said shafts; and control means to selectively actuate said cylinder such that said first shaft is rotated to lift a bale on said tines and as the arms of said first shaft are lowered the bale is deposited on said second pair of arms of said second shaft, then said second is rotated to raise the bale and deposit on the third pair of arms as the third pair of arms are lowered.

* * * * *